United States Patent Office 3,377,030
Patented Apr. 9, 1968

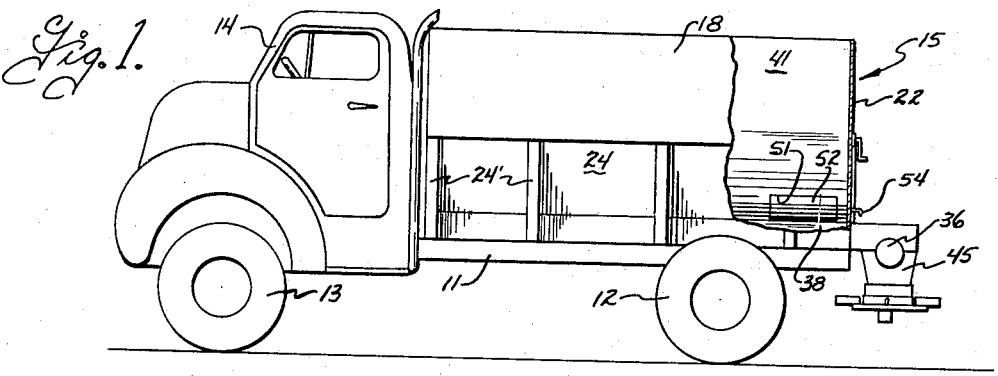
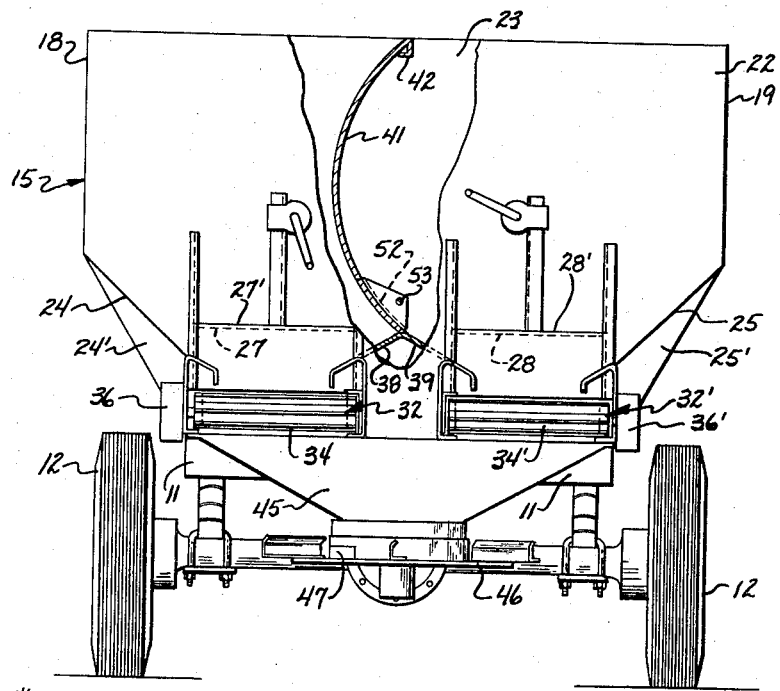
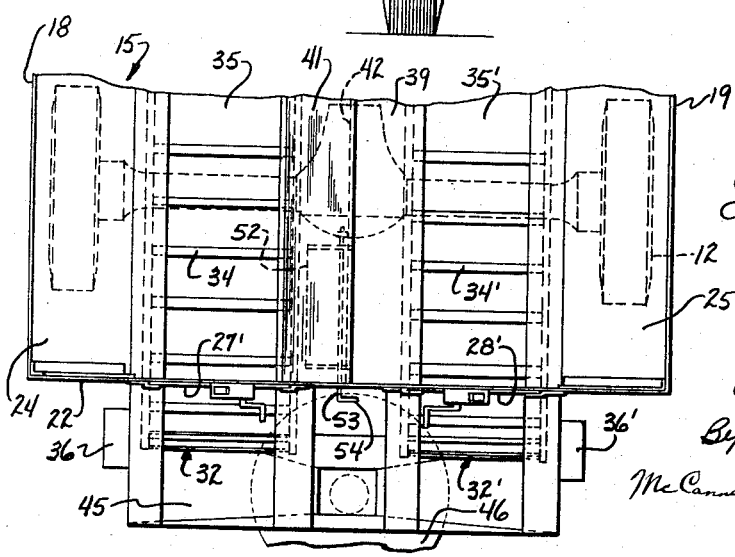

3,377,030
PLURAL COMPARTMENT APPARATUS
Eskil W. Swenson, Cherry Valley, Ill., assignor to
Swenson Spreader & Mfg. Co., Lindenwood, Ill.,
a corporation of Illinois
Filed Dec. 30, 1965, Ser. No. 517,637
10 Claims. (Cl. 239—656)

ABSTRACT OF THE DISCLOSURE

A truck having a broadcast spreader and a V-box hopper mounted thereon. The hopper has a longitudinal divider wall which is arched laterally to divide the hopper into compartments of unequal size. Conveyors are provided for feeding materials from the compartments to the broadcast spreader.

---

This invention relates to a plural compartment apparatus for holding particulate materials and for use on a vehicle.

It has been found that it is frequently desirable to transport and discharge more than one particulate material from a vehicle and that such materials are often used in different proportions. For example, in spreading fertilizer, a frequently used mix is a 60-40 proportion of pot-ash and phosphate. For most economical utilization of the capacity of the vehicle under such circumstances, it is desirable to have compartments of unequal capacity. Accordingly, it is an object of this invention to provide an apparatus for holding particulate materials and having compartments of unequal capacity.

Another object is to provide an apparatus in accordance with the foregoing object having a substantially open top having approximately equal openings to each compartment.

Other objects of this invention are to provide an apparatus in accordance with the above which is of simplified and economical construction, and which provides substantially smooth compartment walls.

These and other objects and advantages of the present invention will become apparent as the invention becomes better understood by reference to the following detailed description when taken in connection with the drawings wherein:

FIGURE 1 is a side elevational view of a vehicle having an embodiment of the present invention mounted thereon and having a portion broken away for better illustration;

FIG. 2 is a rear elevational view of the apparatus of FIG. 1, on a larger scale, and having a portion of the end wall broken away for better illustration; and FIG. 3 is a fragmentary top view thereof.

The apparatus of the present invention is adapted for use with various types of vehicles including self-propelled vehicles such as trucks and the like and trailing-type vehicles which are adapted to be towed. For purpose of illustration, the apparatus is shown applied to a truck-type vehicle having a frame 11, drive wheels 12, steering wheels 13, and a cab 14. The truck, as thus far described, is conventional and further description is deemed unnecessary.

A hopper, generally designated by the numeral 15, is mounted on frame 11. The hopper is adapted to receive particulate material such as salt, sand, fertilizer, or the like, and is herein illustrated as of a general V-box type having a generally open top (FIG. 3). The hopper includes longitudinal side walls 18 and 19 and end walls 22 and 23 connected to the side walls to define a generally rectangular box. Side walls 18 and 19 have downwardly inclined lower portions 24 and 25 which are reinforced by ribs 24' and 25', respectively.

The apparatus of the present invention is particularly adapted to store and dispense different particulate materials from the hopper and, for this purpose, the hopper is divided into compartments in a manner which will hereinafter be described. Means is provided for discharging the materials from the several compartments and, preferably, such means includes an individual opening to each compartment such as openings 27 and 28 in rear end wall 22. These openings are provided with gates 27' and 28', respectively, which may be closed for storage of the material and opened for dispensing from the compartments. Any well-known gate assembly will serve the purpose and further description is deemed unnecessary. For feeding material through the openings, it is possible to use a single conveyor which underlies both compartments; however, it is preferable to use separate conveyors or dispensing means, such as shown at 32 and 32' for individually feeding the materials from the compartments. Conveyors 32 and 32' are conveniently of like construction and are herein shown of the endless type having spaced flights 34 and 34', respectively, for advancing the material lengthwise of the compartments. As is conventional, plates or panels 35 and 35', underlie the flights on the upper runs of the conveyors to support the material as it is advanced. The conveyors may be driven by any convenient means, such as hydraulic motors 36, 36', respectively. It is contemplated that the conveyor or dispensing means may be of any construction and that they may be driven by other than the hydraulic motors illustrated. Preferably, the conveyors or discharge means are adjacent the longitudinal center of the hopper but spaced from each other as best shown in FIG. 2. The bottom of the hopper includes a longitudinal portion covering the area between the conveyors and comprising members 38 and 39 slanting upwardly from each conveyor to an apex generally at the longitudinal center of the hopper.

As stated above, the hopper is divided into compartments and it is preferable that these compartments have unequal sizes, yet provide generally similar openings at the top for filling the compartments. For this purpose, a longitudinal divider wall 41 is provided. Preferably, the divider wall has a semi-circular cross-section with a lower edge mounted adjacent the apex of members 38 and 39 and an upper edge adjacent the top of the hopper and generally vertically above the lower edge. The upper end of the divider wall is advantageously bent into a channel-shaped portion 42 to provide additional support and rigidity for the upper edge. The ends of the structural portion 42 and the ends of the divider wall are connected to the end walls of the hopper in any convenient manner. As best seen in FIG. 2, the upper end of the divider wall is approximately at the longitudinally center line of the hopper thereby providing generally equal openings to the compartments formed by the divider wall. Additionally, the divider wall is arched between its upper and lower ends thereby dividing the hopper into compartments of unequal size. The arched divider wall is preferably formed of steel and, being arched, provides an economical structural arrangement requiring no ribs or reinforcement, thereby leaving a substantially smooth surface along which the material can easily slide when being discharged. While it is contemplated that compartments of different proportions can be formed within the spirit of the present invention, the compartments illustrated in FIG. 2 are approximately 40% and 60% of the total volume of the hopper, on the left and right respectively.

An exemplary use of the apparatus of the present invention is illustrated in the drawings. As shown, conveyors 32 and 32' dispense material to a common chute 45. The chute is conveniently arranged to guide the material to a spreader apparatus, such as broadcast spreader 46, of a type well known. As shown, the material passes through an outlet 47 (FIG. 2) onto the broadcast spreader and is then spread therefrom.

Should it be necessary to utilize the apparatus of the present invention for storing and dispensing a single material in the various compartments, means is provided for communicating the compartments as an aid in distributing the load as it is dispensed by the conveyors. As shown, an opening 51 is provided in the divider wall 41. This opening preferably has a size approximating the size of opening 27. A plate 52 covers the opening and is arranged to be removed therefrom prior to filling the compartments, and, for this purpose, is pivotly mounted on shaft 53 in any convenient manner. Preferably, shaft 53 extends through end wall 22 and has a handle 54 for effectuating movement of the cover plate. Thus, if a single material is to be dispensed, plate 52 is moved prior to filling, thereby exposing opening 51 and communicating the two compartments.

It is now deemed obvious that the present invention provides a dual compartment apparatus for holding particulate materials and for use on a vehicle; that the compartments are of unequal capacity; and that the top openings to each compartment are of approximately equal size. It is also deemed obvious that the apparatus is of simplified and economical construction and that the divider wall provides a substantially smooth wall which does not interfere with the discharge of materials.

While I have thus described a preferred embodiment of my invention this has been done by way of illustration and not limitation and I do not wish to be limited except as required by the appended claims.

I claim:
1. In combination with a vehicle having a generally open-topped hopper on the vehicle for holding particulate materials, spreader means for spreading the particulate materials, said hopper including: longitudinal side walls and lateral end walls connected to the side walls, said walls defining a substantially open top providing access to the hopper, a longitudinal divider wall for dividing the hopper into two unequal compartments for carrying the particulate materials, said divider wall having a generally straight upper edge adjacent the top of the hopper and a generally straight lower edge adjacent the bottom thereof, said upper edge being approximately midway between the side walls to divide the top into two approximately equal openings, said divider wall being arched between said upper and lower edges and connected to said end walls, said arching defining a generally uniform cross-section along the entire length of the divider wall and discharge means for each hopper for moving the particulate materials simultaneously from each compartment to the spreader means.

2. An apparatus as set forth in claim 1 including a longitudinal structural member attached to the end walls adjacent the top thereof any midway between the side walls, and wherein the upper edge of the divider wall is attached to said structural member.

3. An apparatus as set forth in claim 1 wherein the discharge means includes at least one opening associated with each said compartment and mechanically operated means for dispensing the particulate material from each compartment.

4. An apparatus as set forth in claim 3 wherein the arched divider wall has a substantially semicircular cross-section along the entire length of the divider wall.

5. An apparatus as set forth in claim 4 wherein: the mechanically operated means includes first and second longitudinal conveyor means disposed at the bottom of the hopper adjacent the center thereof and each associated with a respective compartment for dispensing the particulate material therefrom, the hopper side walls each have at least the lower portion thereof slanted toward the adjacent conveyor means, the bottom of the hopper includes a longitudinal portion covering the area between said first and second conveyor means, and the lower edge of the divider wall is connected to said portion.

6. An apparatus as set forth in claim 5 wherein: said longitudinal portion slants upwardly from each conveyor means to one apex, the lower edge of the divider wall is connected adjacent said apex, and the divider wall is formed of steel and has a substantially smooth surface whereby the particulate materials easily slide therealong.

7. An apparatus as set forth in claim 1 wherein the discharge means includes first and second longitudinal conveyors, the bottom of the hopper includes a longitudinal portion covering the area between said conveyors and rising upwardly to an apex midway between the side walls, and the divider wall has a semi-circular cross-section and is attached to the end walls adjacent the top thereof and has its lower edge attached to the longitudinal portion adjacent the apex, and the upper and lower edges are approximately vertically aligned.

8. A vehicle and a dual compartment apparatus for holding particulate materials in each compartment and including: a hopper on the vehicle and having a bottom and a generally open rectangular top to provide access for placing the particulate materials into the compartments, said hopper including longitudinal side walls and end walls connected to the side walls, a longitudinal divider wall for dividing the hopper into said dual compartments and having an upper edge adjacent the top of the hopper and a lower edge adjacent the bottom of the hopper, said edges of the divider wall located midway between the side walls and dividing the top into two approximately equal openings, at least a major portion of the divider wall between the edges being disposed laterally from a longitudinal axis located midway between the side walls and intermediate the edges for dividing the hopper into two unequal compartments, and first and second conveyor means for each respective compartment for selectively discharging the particulate materials therefrom.

9. An apparatus as set forth in claim 8 including a longitudinal structural member having ends attached to the end walls adjacent the top thereof midway between the side walls, and wherein the divider wall has a semi-circular cross-section and has its upper edge connected to said structural member.

10. An apparatus as set forth in claim 8 wherein the divider wall has an opening therein for communicating the compartments, and including cover means for selectively closing the opening.

References Cited

UNITED STATES PATENTS

| | | | |
|---|---|---|---|
| 1,894,223 | 1/1933 | Pape | 214—83.36 X |
| 2,092,392 | 9/1937 | Hewitt | 220—22 |
| 2,687,285 | 8/1954 | Fisher. | |
| 3,227,504 | 1/1966 | Dunham | 220—22 X |

GERALD M. FORLENZA, *Primary Examiner.*

ALBERT J. MAKAY, *Examiner.*